Patented Aug. 7, 1951

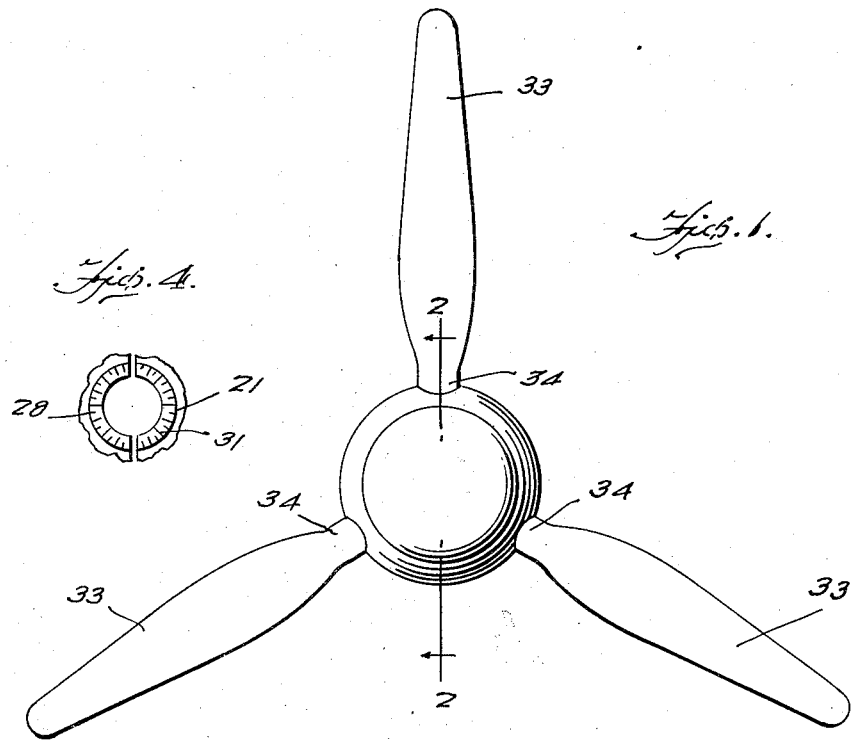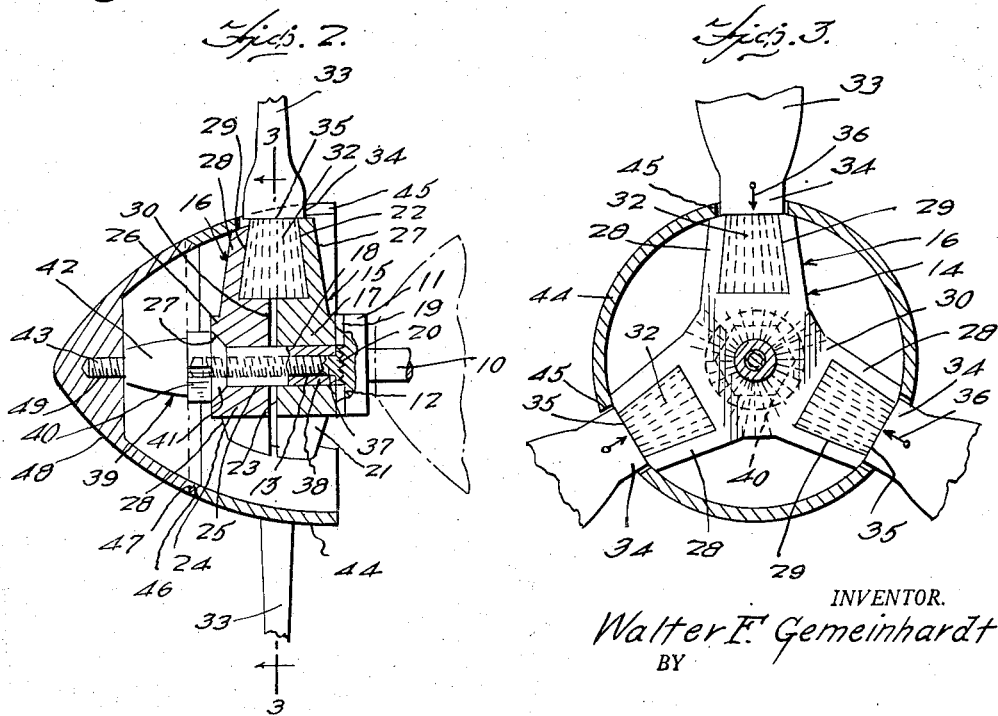

2,563,020

UNITED STATES PATENT OFFICE 2,563,020

PROPELLER ASSEMBLY FOR MODEL AIRPLANES

Walter F. Gemeinhardt, Medford, Oreg.

Application May 20, 1949, Serial No. 94,466

2 Claims. (Cl. 170—160.61)

My invention relates to a propeller assembly for model airplanes and the like.

A primary object of the invention is to provide a propeller assembly for model airplanes, wherein the pitch of the individual blades may be adjusted.

A further object of the invention is to provide a novel and simplified propeller assembly, well adapted to quick changes of propellers and pitch, and so designed as to reduce the modeler's expense of buying a whole new propeller when any one blade cracks or breaks in a mishap.

A further object is to provide a propeller assembly, wherein the individual blades may be rotated in their sockets either clockwise, or counterclockwise, so that the assembly is adaptable for push or pull flight.

A still further object of the invention is to provide a propeller assembly of the class mentioned, which is very sturdy and fool proof, and quite cheap to manufacture.

Other objects and advantages of the invention will be apparent during the course of the following description.

In the accompanying drawings, forming a part of this application, and in which like numerals are employed to designate like parts throughout the same, Figure 1 is a front elevation of the propeller assembly embodying the invention, Figure 2 is a central vertical section taken on line 2—2 of Figure 1, parts broken away, parts in elevation, Figure 3 is a vertical transverse section taken on line 3—3 of Figure 2, and, Figure 4 is a fragmentary elevation of the end of a propeller blade socket.

In the drawings, where for the purpose of illustration is shown a preferred embodiment of the invention, the numeral 10 designates generally a forward crankshaft extension of a model airplane engine, not shown. The crankshaft extension 10 has an integral substantially flat circular disc or plate 11, knurled upon its forward face to provide radially arranged teeth or serrations 12. Forwardly of the disc 11, the crankshaft extension further includes an integral reduced screw threaded extension 13, extending axially forwardly of the disc 11.

The numeral 14 designates generally a propeller hub, formed by a pair of companion hub sections 15 and 16, adapted to be mounted in opposed relation upon the reduced screw threaded extension 13. The hub section 15 is disposed adjacent to the forward face of the disc 11, and comprises a central body portion 17, provided with a central axial bore 18, which is considerably larger in diameter than the diameter of the reduced screw threaded extension. At its inner side, the hub section 15 has a central boss 19, provided in its face with radially arranged teeth or serrations 20, which interfit with the serrations 12 to prevent the hub from rotating relative to the crankshaft. The hub section 15 further includes three integral angularly equidistantly spaced radial arms or socket sections 21, each socket section being conically tapered outwardly, and provided in its forward face with a substantially semi-conical recess 22, also tapering conically outwardly, as shown. The surface of each recess 22 is also knurled, or the like, to provide axially extending serrations, as shown. The forward face 23 of the hub section 15 is straight and flat, and common to the central body portion 17 and three socket sections 21.

The hub section 16 is substantially identical with the hub section 15 and is arranged axially forwardly of the section 15 upon the screw threaded extension 13. The hub section 16 has a central body portion 24, having a central axial bore 25, of the same diameter as the bore 18. At its forward side, the hub section 16 has a central boss 26, provided with a conically tapered countersunk recess 27, concentric with the bore 25. The hub section 16 further includes radially disposed integral socket sections 28, positioned adjacent to the socket sections 21, and being conically tapered outwardly. The socket sections 28 are radially shorter than the socket sections 21, as shown, and are provided with companion substantially semiconical recesses 29, which coact with the recesses 22 to form conical sockets which taper radially outwardly. The faces of the recesses 29 are knurled to provide radial serrations, like the serrations of the recesses 22. The rear face 30 of the hub section 16 is straight and flat, and the opposed faces 25 and 30 are machined sufficiently so that they will remain spaced slightly in assembly, as shown. The outer annular ends of the radial socket sections 21 and 28 are preferably provided with a plurality of circumferentially spaced degree graduations 31, as shown in Figure 4.

Mounted within the tapered socket recesses 22 and 29 are conically tapered shanks 32 of propeller blades 33, having enlarged generally cylindrical intermediate portions 34, forming annular lateral shoulders 35 which are adapted to contact the outer ends of socket sections 21, as shown. The tapered shanks 32 have axially extending teeth or serrations in their conical faces, which interfit with the serrations of the recesses 22 and 29 and prevent the blades 33 from rotating on their longitudinal axes in assembly. Each propeller blade is preferably provided upon the periphery of its cylindrical portion 34 and adjacent to its shoulder 35 with zero reference mark or graduation 36, as shown.

Mounted directly upon the reduced screw threaded extension 13 of the crankshaft, and having a screw threaded bore 37 to receive such extension is an integral cylindrical tubular sleeve 38, of a crankshaft nut 39, also including an enlarged hexagonal head 40, having a conically tapered rear shoulder 41 to enter the conically tapered recess 27. The sleeve 38 extends snugly through the bores 25 and 18 of the hub sections, and forms an intermediate bushing or bearing between the hub sections 15 and 16 and screw threaded extension 13. The rear end of sleeve 38 terminates just forwardly of the forward face of disc 11 in assembly. The nut 39 further includes an integral forwardly tapered extension 42, having a front reduced axial screw threaded extension 43, integral therewith.

A streamlined spinner is provided to enclose the hub 14 and comprises a rear spinner section 44, having notches 45 in its rear edge, which notches receive the cylindrical portions 34 of the blades 33 in assembly. The inner surface of the rear spinner section 44 bears against the outer ends of the socket sections 21 and 28, as shown. The forward edge of the spinner section 44 is beveled, as at 46, to receive the rear beveled end 47 of a forward spinner section 48, having a central screw threaded opening 49, to receive the screw threaded extension 43.

It is desirable to make all of the parts of the assembly out of a light metal, such as aluminum, except the blades 33, which are preferably hard wood. Obviously, the hub 14 and spinner may be designed for two-blade and four-blade propellers, if desirable. If desired, the spinner may be made in one piece, rather than two, as shown.

In use, the parts are assembled as in Figure 2, and the nut 39 is loose. The hub sections 15 and 16 will separate sufficiently for the blades 33 to be turned in the companion recesses 22 and 29 to provide the desired pitch, such pitch being determined by the relation of the reference mark 36 to the graduations 31. The nut 39 is then tightened with a wrench upon the hexagonal head 40 and the two hub sections are clamped together upon the blade shanks 32, which cannot rotate because of their serrations. Likewise, the hub 14 is locked against the disc 11, and cannot rotate because of serrations 12 and 20. The tightening of nut 39 draws the shoulders 35 into tight contact with the ends of the blade sockets. Finally, the spinner sections 44 and 48 are applied and the forward section 44 tightened. The tapered shoulder 41 and beveled edges 46 and 47 help to center and lock the assembly together.

It is to be understood that the form of the invention, herewith shown and described, is to be taken as a preferred example of the same, and that various changes in the shape, size and arrangement of parts may be resorted to, without departing from the spirit of the invention, or the scope of the subjoined claims.

Having thus described the invention, I claim:

1. A propeller assembly for a model airplane engine having a crankshaft extension comprising a disk transversely mounted on the crankshaft extension, a threaded member projecting forwardly from the disk and axially aligned with the crankshaft extension, an elongated sleeve threaded on the member and having an axially enlarged head at its forward end, a pair of companion hub sections disposed concentrically on the sleeve between the head and the disk, the hub sections having companion radially tapered recesses forming radial disposed split sockets, propeller blades radially carried by the hub sections and having radially tapered shanks clampingly mounted in the sockets, a screw member projecting forwardly of the head of the sleeve in axial alignment therewith and a conical spinner enclosing said hub sections, said spinner having a threaded socket interiorly of its minor end for the reception of said screw member and being formed with slots for the passage of the blades radially therethrough.

2. A propeller assembly for a model airplane engine having a crankshaft extension comprising a disk transversely mounted on the crankshaft extension, a threaded member projecting forwardly from the disk and axially aligned with the crankshaft extension, an elongated sleeve threaded on the member and having an axially enlarged head at its forward end, a pair of companion hub sections disposed concentrically on the sleeve between the head and the disk, the hub sections having companion radially tapered recesses forming radial disposed split sockets, propeller blades radially carried by the hub sections and having radially tapered shanks clampingly mounted in the sockets, a screw member projecting forwardly of the head of the sleeve in axial alignment therewith and a conical spinner enclosing said hub sections, said spinner having a threaded socket interiorly of its minor end for the reception of said screw member and being formed with slots for the passage of the blades radially therethrough, said disc having a serrated face abutting one of the hub sections and the other hub section having a central disposed counter bore for the reception of the sleeve head.

WALTER F. GEMEINHARDT.

REFERENCES CITED

The following references are of record in the file of this patent:

UNITED STATES PATENTS

| Number | Name | Date |
|---|---|---|
| 1,608,755 | McCauley | Nov. 30, 1926 |
| 1,634,330 | Malm | July 5, 1927 |
| 1,661,633 | Nixon | Mar. 6, 1928 |
| 1,730,742 | Nelson | Oct. 8, 1929 |
| 1,773,319 | Raven | Aug. 9, 1930 |
| 1,801,725 | Cook | Apr. 21, 1931 |
| 1,926,428 | Brauchler | Sept. 12, 1933 |
| 2,234,073 | Burnham | Mar. 4, 1941 |
| 2,278,900 | Sensenich | Apr. 7, 1942 |

FOREIGN PATENTS

| Number | Country | Date |
|---|---|---|
| 419,505 | France | Oct. 27, 1910 |